United States Patent [19]
Glynn

[11] Patent Number: 5,788,555
[45] Date of Patent: Aug. 4, 1998

[54] SMALL ANGLE INTERCONNECTING TOY BLOCKS

[76] Inventor: Kenneth P. Glynn, 29 Plennert La., Flemington, N.J. 08822

[21] Appl. No.: 285,355

[22] Filed: Aug. 3, 1994

[51] Int. Cl.$^6$ .................................. A63H 33/03
[52] U.S. Cl. .................. 446/124; 446/124; 446/126; 446/128; 403/4; 403/263; 403/359
[58] Field of Search ................... 446/122, 125, 446/126, 128; 403/3, 4, 263, 359

[56] References Cited

U.S. PATENT DOCUMENTS

| Re. 33,785 | 12/1991 | Hildebrandt et al. | 446/126 |
|---|---|---|---|
| D. 311,935 | 11/1990 | Andersen. | |
| D. 317,478 | 6/1991 | Larsen et al. | |
| 3,005,282 | 10/1961 | Christiansen. | |
| 3,242,610 | 3/1966 | Christiansen. | |
| 3,405,479 | 10/1968 | Paulson. | |
| 4,964,833 | 10/1990 | Suzuki | 446/128 |
| 5,009,599 | 4/1991 | Mueller | 446/122 |
| 5,259,803 | 11/1993 | Lyman | 446/128 |

FOREIGN PATENT DOCUMENTS

| 498368A | 8/1992 | European Pat. Off. | 446/122 |
|---|---|---|---|
| 464926 | 4/1914 | France | 446/126 |
| 1159319 | 6/1958 | France | 446/126 |
| 184497 | 1/1956 | Germany. | |
| 8101581 | 10/1982 | Netherlands | 446/122 |
| 2108857 | 5/1983 | United Kingdom | 446/122 |

Primary Examiner—Robert A. Hafer
Assistant Examiner—Jeffrey D. Carlson
Attorney, Agent, or Firm—Kenneth P. Glynn, Esq.

[57] ABSTRACT

The present invention involves a toy construction block set which includes at least two toy construction blocks and at least one toy construction block extender which are removable and attachable. A top of the block has a plurality of symmetrically arranged elongated protrusions for interlocking with a recessed bottom having a plurality of projections, on other, similar blocks. A toothed hole is located on at least one of the top, sidewalls, or a friction post of the block for angularly interconnecting with an elongated toothed interconnecting positioning rod located on at least one of the top, sidewalls, or bottom of a similar toy block. The elongated toothed interconnecting positioning rod when inserted into the toothed hole of a similar block or block extender permits a number of angular alignments between the blocks and the extender proportional to the number of teeth on the elongated toothed interconnecting positioning rod and toothed hole.

13 Claims, 5 Drawing Sheets

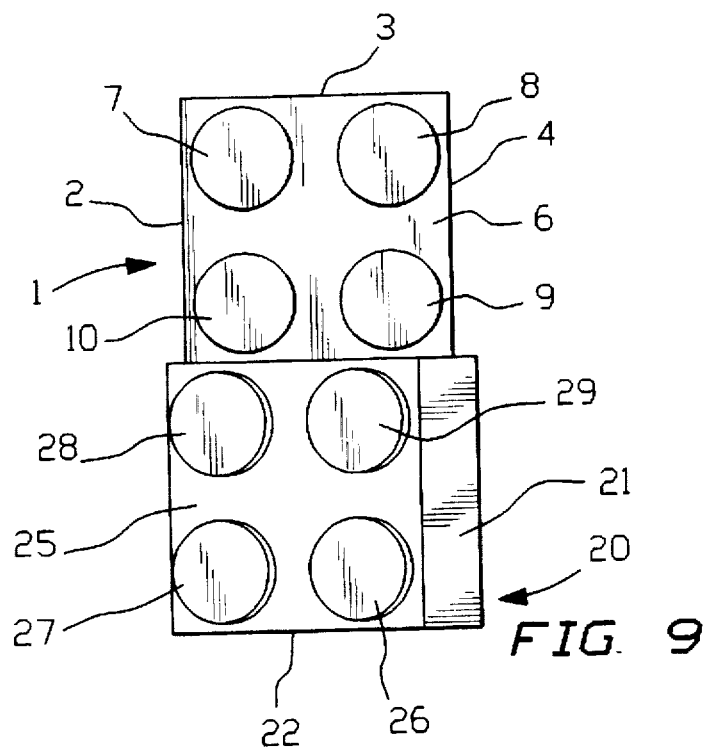
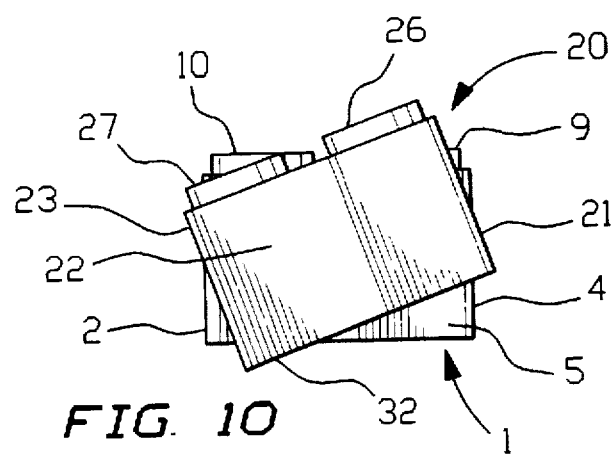

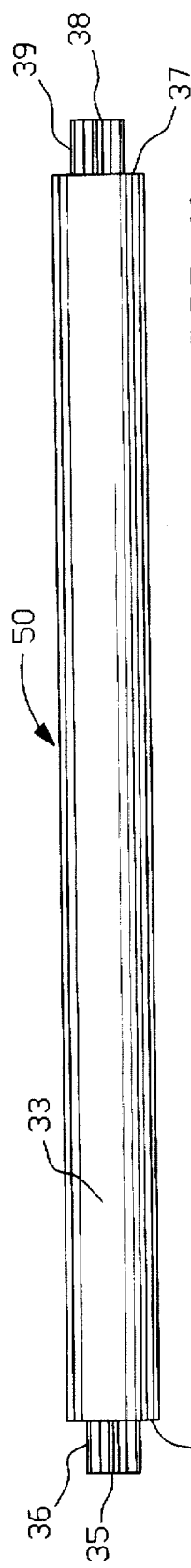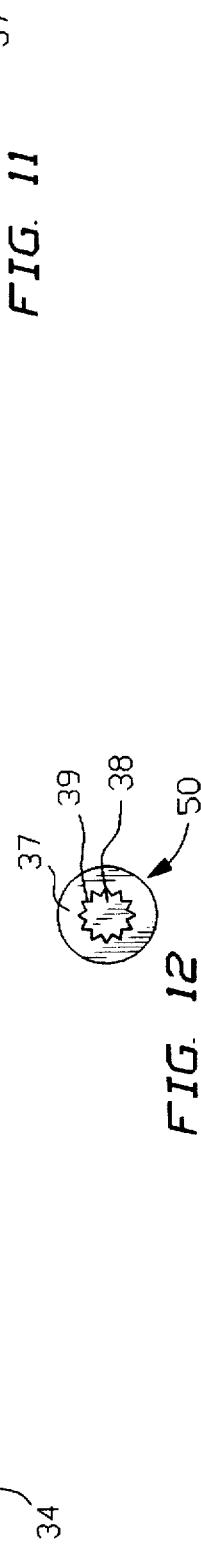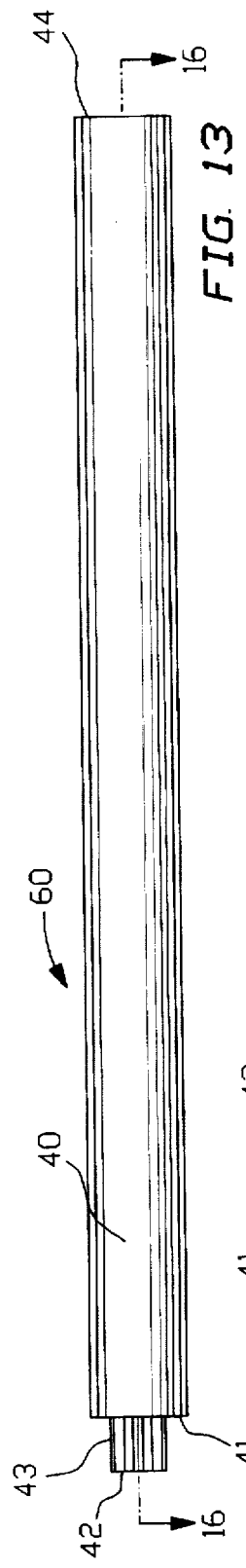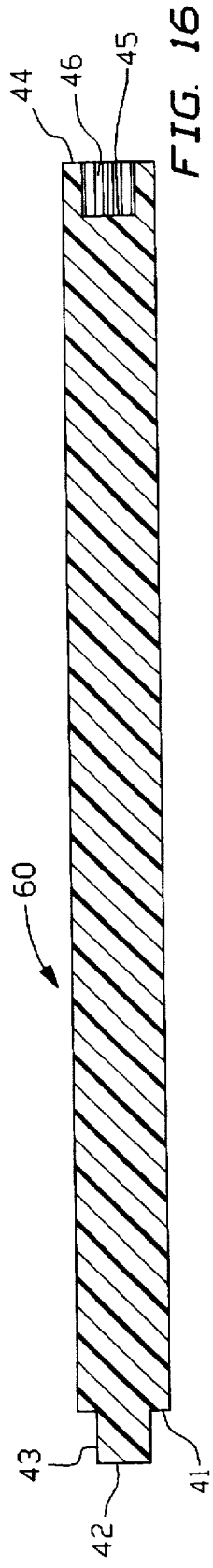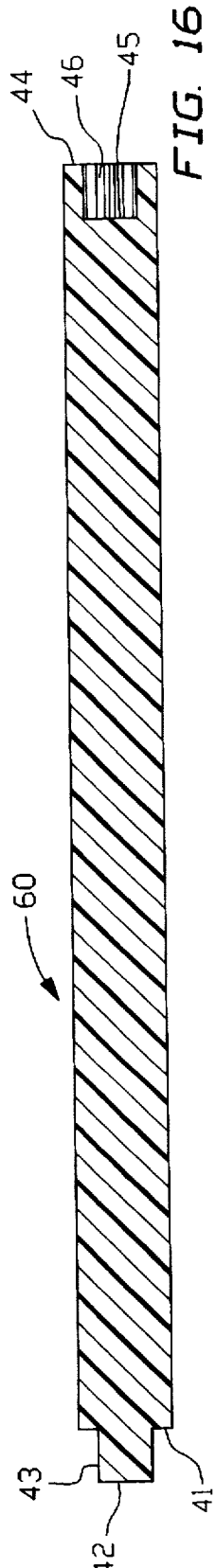

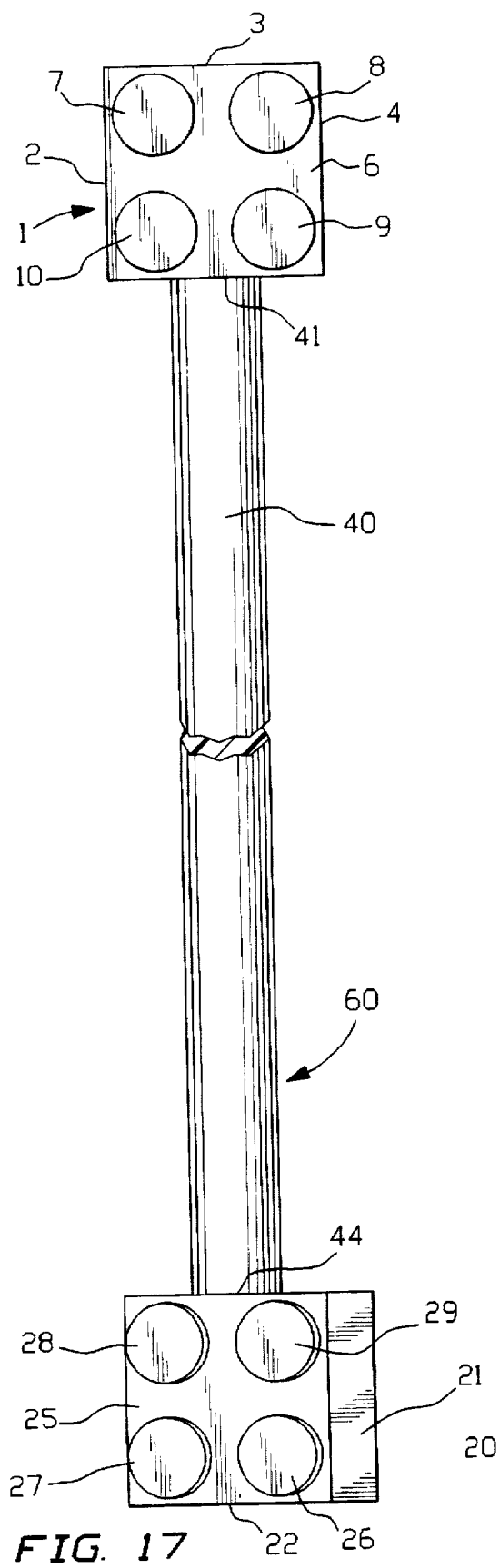
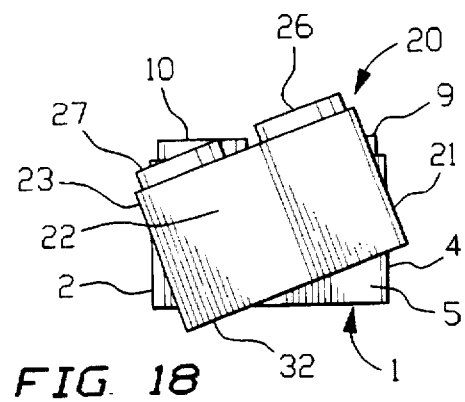
FIG. 17
FIG. 18

SMALL ANGLE INTERCONNECTING TOY BLOCKS

BACKGROUND OF THE INVENTION

1. Field of the Invention

The present invention involves a set of at least two toy construction blocks and a toy construction block extender which are attachable and removable. More specifically the present invention toy construction blocks have a main outer structure with a top, a bottom and four sidewalls, and with protrusions on the top for interlocking with other, similar blocks with a recessed bottom. More specifically, the present invention has elongated toothed interconnecting positioning rods and toothed holes for angular interconnection with similar complementary elements which angularly interconnects the toy construction block with a toy construction block extender and with a similar toy construction block.

2. Information Disclosure Statement

Toy blocks have been around for perhaps more than a century. Plastic snap-in blocks have likewise existed for many decades. Lego™ blocks (Trademark of Interlego, A.G., offices in Enfield, Conn.), have been popular for decades.

U.S. Design Pat. No. 311,935 shows a toy building element that includes a block base and a column, but this is a single unit with no angular interconnection.

U.S. Design Pat. No. 317,478 shows a toy building element that is an elongated open webbed block which apparently acts to extend the height of the toy construction blocks, but, again there is no provision for angular interconnection.

U.S. Pat. No. 3,242,610, issued on Mar. 29, 1966, shows a flexible connector for toy blocks, but does not show a sidewall or top insertion and there is no provision for angular interconnection.

U.S. Pat. No. 3,005,282, issued on Oct. 24, 1961 describes interlocking blocks with symmetrical protrusions and FIG. 12 shows a cut view of a block with a vertical orifice there through. However, there is no teaching or showing of angular interconnection.

U.S. Pat. No. 3,405,479, issued on Oct. 15, 1968 describes interlocking toy building blocks which are adapted to attach itself to other toy blocks and independently support shaft members in one of several angular positions with respect to the side walls. This patent teaches that the shaft members may have a cross section of an ellipse, square, rectangle or triangle. However, there is no teaching or showing that the blocks can be angularly connected to another set of blocks by a construction block extender. The Patent teaches and shows the attachment of dowels into sockets but does not teach or show the extension of the blocks through the use of a construction block extender in a selective angular alignment.

German Patent 184497 FIGS. 1 and 2 show a toothed protrusion and a corresponding toothed hole. However, it does not teach or show the extension of the blocks through the use of a construction block extender in a selective angular alignment.

SUMMARY OF THE INVENTION

The present invention involves a toy construction block set which includes at least two toy construction blocks and at least one toy construction block extender which are attachable and removable. The toy construction block includes a main outer structure having a top, four sidewalls and a bottom. The toy construction block top has a plurality of symmetrically arranged elongated protrusions for interlocking with other, similar blocks.

The critical features are that at least one toothed hole or at least one elongated toothed interconnecting positioning rod is located on at least one of the top, sidewalls and friction post of the toy construction block for angularly connecting with a similar complementary connection element of a similar toy construction block or of a toy construction block extender.

In preferred embodiments, a plurality of toothed holes are located on the top, sidewalls and bottom, of the toy construction block for angularly connecting with a toy construction block with an elongated toothed interconnecting positioning rod which is located on at least one of the top, sidewalls or bottom for angularly connecting with a similar block.

The toy construction block extender has at least two connection elements, an elongated toothed interconnecting positioning rod and/or a toothed hole for angular interconnection with similar complementary connection elements.

DESCRIPTION OF THE DRAWINGS

The present invention will be more fully understood when the specification herein is taken in conjunction with the drawings appended hereto, wherein:

FIGS. 9 and 10 show a top and side view of a toy construction block with elongated toothed interconnecting positioning rod shown in FIGS. 5, 6, 7 and 8 angularly inserted into a toy construction block shown in FIGS. 1, 2, 3 and 4.

FIGS. 11 and 12 show a side view and end view respectively of an interconnecting extender with two elongated toothed interconnecting positioning rods.

FIGS. 13, 14 and 15 show a side view, and end views respectively of an interconnecting extender with an elongated toothed interconnecting positioning rod and toothed hole.

FIG. 16 shows a side cut of an interconnecting extender with an elongated toothed interconnecting positioning rod and toothed hole shown in FIGS. 13, 14 and 15.

FIGS. 17 and 18 show a top and side view of a toy construction block with elongated toothed interconnecting positioning rod shown in FIGS. 5, 6, 7 and 8 angularly inserted into an elongated toothed interconnecting positioning rod and toothed hole shown in FIGS. 13, 14 and 15 which is angularly inserted into a toy construction block shown in FIGS. 1, 2, 3 and 4.

DETAILED DESCRIPTION OF THE PRESENT INVENTION

Figure 1:
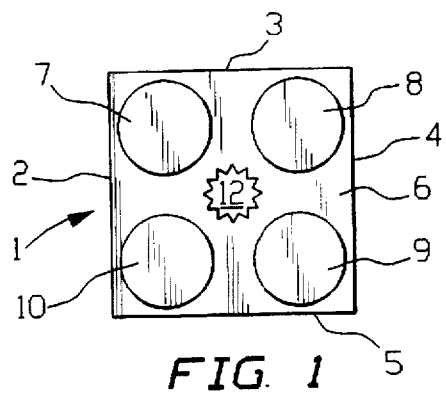
FIGS. 1, 2, and 3 show a top, a bottom and a side view respectively of a present invention toy construction block with toothed hole.
Figure 2:
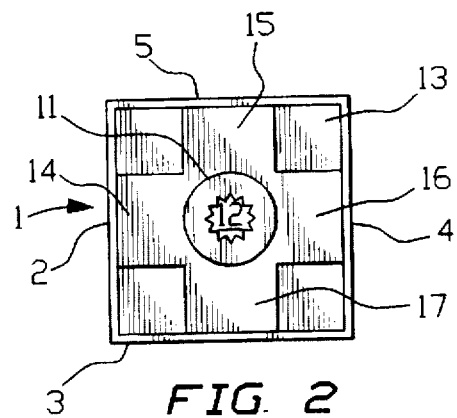

FIG. 1 shows a top view of toy construction block 1 which has a main outer structure with a top 6 and four sidewalls 2, 3, 4 and 5. Top 6 has four protrusions 7, 8, 9 and 10 which are symmetrically arranged and are adapted to interlock with other, similar blocks by pressing the top 6 into a recessed bottom 13 having a centrally located hollow friction post 11, which together with sidewalls 2, 3, 4, and 5 create a clamping effect for the protrusions 7, 8, 9 and 10. Located in the center of top 6 is a toothed hole 12. As shown in FIGS. 1 and 2, toothed hole 12 specifically passes entirely through block 1, but could alternately be closed off or truncated so as to be two toothed holes with end surfaces.

Figure 3:
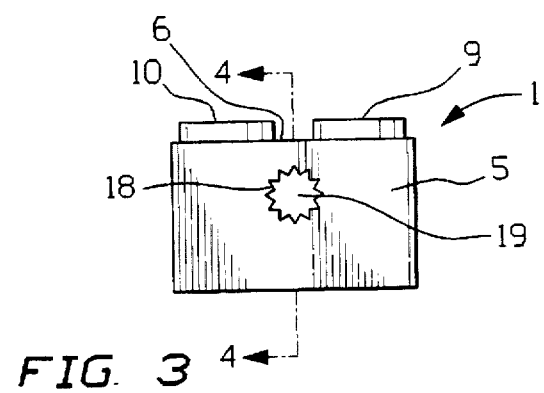
Figure 4:
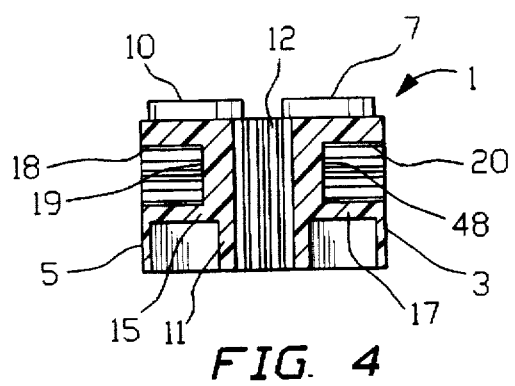
FIG. 4 shows a side cut view of the present invention toy construction block with toothed hole shown in FIGS. 1, 2 and 3.

Referring to FIGS. 1, 2 and 3 together, with all identical parts being identically numbered, note that there are four partial tubular members 14, 15, 16 and 17 on recessed bottom 13. The partial tubular members 14, 15, 16 and 17 extend below sidewall toothed holes 18 and 20 (FIG. 4). Friction post 11 extends from recessed bottom 13 with toothed hole 12 (FIGS. 2 and 4). All sidewalls, that is, sidewalls 2, 3, 4 and 5 have toothed holes as exemplified by toothed hole 18 in sidewall 5 and has an end surface 19.

FIG. 4 is a side cut view of block 1 shown in FIGS. 1, 2 and 3 at cut line 4—4 shown in FIG. 3, identical parts shown in previous Figures being identically numbered. Here two sidewall toothed holes 18 and 20 are shown, as well as toothed hole 12 which forms a complete vertical pass through, including being a part of a hollow area of friction post 11. The sidewall tooth hole 20 has an end surface 48.

Figure 5:
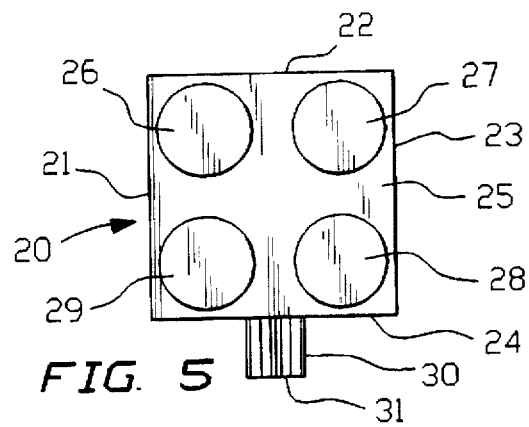
FIGS. 5, 6 and 7 show a top, a bottom and a side view respectively of the present invention toy construction block with elongated toothed interconnecting positioning rod; and, FIG. 8 shows a side cut view of the present invention toy construction block with elongated toothed interconnecting positioning rod shown in FIGS. 5, 6 and 7.

FIG. 5 shows a top view of toy construction block 20 which has a main outer structure with a top 25, four sidewalls 21, 22, 23 and 24 and a bottom 32. Top 25 has four protrusions 26, 27, 28 and 29 which are symmetrically arranged and are adapted to interlock with other blocks similar to block 1. Located in the center of sidewall 24 is an elongated toothed interconnecting positioning rod 30 with an end surface 31.

As shown in FIGS. 5, 6, 7 and 8, elongated toothed interconnecting positioning rod 30 is specifically located on sidewall 24, but could alternately be located on the bottom and or additional sidewalls.

Figure 6:
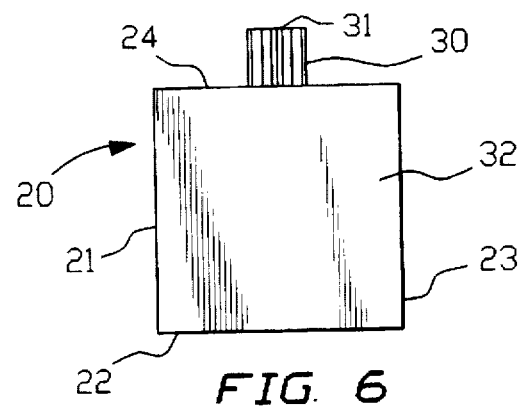
Figure 7:
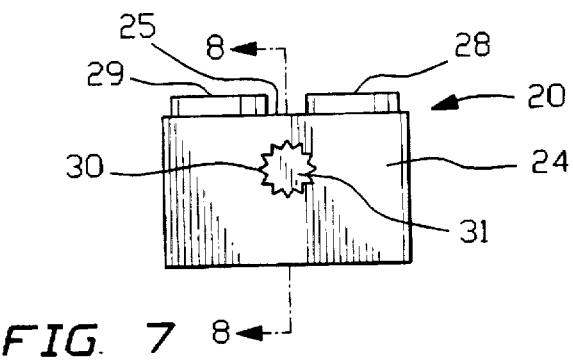
Figure 8:
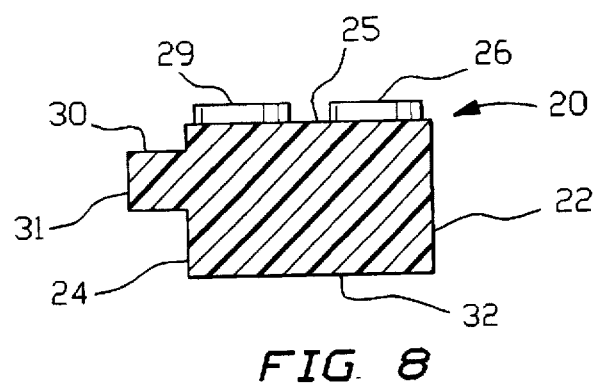

FIG. 8 is a side cut view of block 20 shown in FIGS. 5, 6 and 7 at cut line 8—8 shown in FIG. 7, identical parts shown in previous Figures being identically numbered. Here elongated toothed interconnecting positioning rod 30 and end surface 31 are shown.

FIGS. 6 and 8 show a block with a solid bottom, but could alternately be a recessed bottom.

FIGS. 9 and 10 show a top view and side view of toy construction block 20 with elongated toothed interconnecting positioning rod 30 inserted into toothed hole 18 of toy construction block 1 resulting in toy construction block 20 being angularly interconnected to toy construction block 1.

FIGS. 9 and 10 show one angular interconnection of toy construction block 20 relative to toy construction block 1, which has number of angular alignments, proportional to the number of teeth on elongated toothed interconnecting positioning rod 30 and toothed hole 18.

FIGS. 1, 2, 3 and 4 show the toothed hole having 12 teeth and FIGS. 5, 6 and 7 show the elongated toothed interconnecting positioning rod having 12 teeth, but could alternately have a greater number of teeth for a greater number of angular alignments, or could alternately have as few as three teeth for three angular alignments.

FIG. 11 shows a side view of the construction block extender 50 which has a main body portion 33 and ends 34 and 37. Located in the center of end 34 is an elongated toothed interconnecting positioning rod 36 with an end surface 35. Located in the center of end 37 is an elongated toothed interconnecting positioning rod 39 with an end surface 38.

Referring to FIGS. 11 and 12 together, with all identical parts being identically numbered, end 37 is shown. End 34 has a similar detail but alternately does not have to have an elongated toothed positioning rod.

FIG. 13 shows a side view of the construction block extender 60 which has a main body portion 40 and end surfaces 41 and 44. Located in the center of end 41 is an elongated toothed interconnecting positioning rod 43 with an end surface 42.

Referring to FIGS. 13, 14 and 15 together, with all identical parts being identically numbered, ends 41 and 44 are shown.

FIG. 15 shows located in the center of end 44 a toothed hole 46 and an end surface 45.

FIG. 16 is a cut view of toy block extender 60 shown in FIGS. 13, 14 and 15 at cut line 16—16 shown in FIG. 13, identical parts shown in previous Figures being identically numbered.

FIGS. 17 and 18 show a top view and a side view of a toy construction block 20 with elongated toothed interconnecting positioning rod 30 angularly inserted into toothed hole 46 of toy construction block extender 60. The elongated toothed interconnecting positioning rod 43 of toy construction block extender 40 is angularly inserted into toothed hole 18 of toy construction block 1 resulting in toy construction block 20 being angularly interconnected to toy construction block 1.

FIGS. 11, 12, 13, 14, 15, 16, 17 and 18 show the interconnecting extender having the elongated toothed interconnecting positioning rod axially aligned with another elongated toothed interconnecting positioning rod or toothed hole, but could alternately have shown other alignments.

FIGS. 11, 12, 13, 14, 15, 16 and 17 show the interconnecting extender having a cylindrical shape, but could alternately have shown other shapes.

Obviously, numerous modifications and variations of the present invention are possible in light of the above teachings. It is therefore understood that within the scope of the appended claims, the invention may be practiced otherwise than as specifically described herein.

What is claimed is:

1. A toy construction block set comprising:

a first toy construction block, a second toy construction block, and a toy construction block extender;

said first toy construction block including:

a main outer structure having a top, four sidewalls and an open bottom, said top having a plurality of symmetrically arranged elongated protrusions for interlocking with other, similar toy construction blocks;

said open bottom exposing an underside of said top;

said underside of said top including a plurality of symmetrically arranged partial tubular members projecting from said underside of said top and an elongated friction post extending from said underside of said top, each partial tubular member being centrally located with respect to said sidewall, said friction post being hollow and being centrally and symmetrically located on said underside of said top;

said first toy construction block having at least one toothed hole located on at least one of said top, said sidewalls and said friction post for angularly connecting an elongated toothed interconnecting positioning rod;

said toy construction block extender including:
  a body portion; and
  two elongated toothed interconnecting positioning rods for angularly connecting an interconnecting toothed hole;

said second toy construction block including:
  a main outer structure having a top, four sidewalls and an open bottom, said top having a plurality of symmetrically arranged elongated protrusions for interlocking with other, similar toy construction blocks;
  said open bottom exposing an underside of said top;
  said underside of said top including a plurality of symmetrically arranged partial tubular members projecting from said underside of said top and an elongated friction post extending from said underside of said top, each partial tubular member being centrally located with respect to said sidewall, said friction post being hollow and being centrally and symmetrically located on said underside of said top;
  said second toy construction block having at least one toothed hole located on at least one of said top, said sidewalls and said friction post for angularly connecting an elongated toothed interconnecting positioning rod.

2. The toy construction block set of claim 1 wherein said first toy construction block further includes an elongated toothed interconnecting positioning rod located on at least one of said top and said sidewalls.

3. The toy construction block set of claim 2 wherein said second toy construction block further includes an elongated toothed interconnecting positioning rod located on at least one of said top and said sidewalls.

4. The toy construction block set of claim 3 wherein a number of teeth on said toothed hole of said first toy construction block determines a number of angular alignments between said toy construction block extender and said first toy construction block.

5. The toy construction block set of claim 4 wherein a number of teeth on said toothed hole of said second toy construction block determines a number of angular alignments between said toy construction block extender and said second toy construction block.

6. A toy construction block set comprising:
  a first toy construction block,
  a second toy construction block, and
  a toy construction block extender;
said first toy construction block including:
  a main outer structure having a top, four sidewalls and an open bottom, said top having a plurality of symmetrically arranged elongated protrusions for interlocking with other, similar toy construction blocks;
  said open bottom exposing an underside of said top;
  said underside of said top including a plurality of symmetrically arranged partial tubular members projecting from said underside of said top and an elongated friction post extending from said underside of said top, each partial tubular member being centrally located with respect to said sidewall, said friction post being hollow and being centrally and symmetrically located on said underside of said top;
  said first toy construction block having at least one toothed hole located on at least one of said top, said sidewalls and said friction post for angularly connecting an elongated toothed interconnecting positioning rod;

said toy construction block extender including:
  a body portion;
  an elongated toothed interconnecting positioning rod for angularly connecting an interconnecting toothed hole; and
  a toothed hole for angularly connecting an elongated toothed interconnecting positioning rod;

said second toy construction block including:
  a main outer structure having a top, four sidewalls and an open bottom, said top having a plurality of symmetrically arranged elongated protrusions for interlocking with other, similar toy construction blocks;
  said open bottom exposing an underside of said top;
  said underside of said top including a plurality of symmetrically arranged partial tubular members projecting from said underside of said top and an elongated friction post extending from said underside of said top, each partial tubular member being centrally located with respect to said sidewall, said friction post being hollow and being centrally and symmetrically located on said underside of said top;
  said second toy construction block having at least one elongated toothed interconnecting positioning rod located on at least one of said top and said sidewalls for angularly connecting a toothed hole.

7. The toy construction block set of claim 6 wherein said first toy construction block further includes an elongated toothed interconnecting positioning rod located on at least one of said top and said sidewalls.

8. The toy construction block set of claim 7 wherein said second toy construction block further includes a toothed hole located on at least one of said top, said sidewalls and said friction post.

9. The toy construction block set of claim 8 wherein a number of teeth on said toothed hole of said first toy construction block determines a number of angular alignments between said toy construction block extender and said first toy construction block.

10. The toy construction block set of claim 9 wherein a number of teeth on said elongated toothed interconnecting rod of said second toy construction block determines a number of angular alignments between said toy construction block extender and said second toy construction block.

11. A toy construction block set comprising:
  a first toy construction block,
  a second toy construction block, and
  a toy construction block extender;
said first toy construction block including:
  a main outer structure having a top, four sidewalls and an open bottom, said top having a plurality of symmetrically arranged elongated protrusions for interlocking with other, similar toy construction blocks;
  said open bottom exposing an underside of said top;
  said underside of said top including a plurality of symmetrically arranged partial tubular members projecting from said underside of said top and an elongated friction post extending from said underside of said top, each partial tubular member being centrally located with respect to said sidewall, said friction post being hollow and being centrally and symmetrically located on said underside of said top;
  said first toy construction block having at least one elongated toothed interconnecting positioning rod located on at least one of said top and said sidewalls for angularly connecting a toothed hole;

said toy construction block extender including:

a body portion; and two toothed holes for angularly connecting an elongated toothed interconnecting positioning rod;

said second toy construction block including:

a main outer structure having a top, four sidewalls and an open bottom, said top having a plurality of symmetrically arranged elongated protrusions for interlocking with other, similar toy construction blocks;

said open bottom exposing an underside of said top;

said underside of said top including a plurality of symmetrically arranged partial tubular members projecting from said underside of said top and an elongated friction post extending from said underside of said top, each partial tubular member being centrally located with respect to said sidewall, said friction post being hollow and being centrally and symmetrically located on said underside of said top;

said second toy construction block having at least one elongated toothed interconnecting positioning rod located on at least one of said top and said sidewalls for angularly connecting a toothed hole.

12. The toy construction block set of claim 11 wherein said first toy construction block further includes a toothed hole located on at least one of said top, said sidewalls and said friction post.

13. The toy construction block set of claim 11 wherein said second toy construction block further includes a toothed hole located on at least one of said top, said sidewalls and said friction post.

* * * * *